United States Patent
Sampson

(10) Patent No.: US 8,439,317 B2
(45) Date of Patent: May 14, 2013

(54) GROMMETED CLAMP ASSEMBLY

(75) Inventor: James M. Sampson, Southfield, MI (US)

(73) Assignee: Franklin Fastener Company, Redford, MI (US)

( * ) Notice: Subject to any disclaimer, the term of this patent is extended or adjusted under 35 U.S.C. 154(b) by 428 days.

(21) Appl. No.: 12/714,845

(22) Filed: Mar. 1, 2010

(65) Prior Publication Data

US 2010/0219301 A1    Sep. 2, 2010

Related U.S. Application Data

(60) Provisional application No. 61/156,075, filed on Feb. 27, 2009.

(51) Int. Cl.
*F16L 3/00* (2006.01)
(52) U.S. Cl.
USPC .............. 248/74.4; 248/743; 248/73; 248/63
(58) Field of Classification Search .............. 248/62, 248/63, 68.1, 73, 74.1, 74.3, 74.4; 24/530, 24/542, 543
See application file for complete search history.

(56) References Cited

U.S. PATENT DOCUMENTS

| | | | |
|---|---|---|---|
| 1,805,006 A | 5/1931 | Neilon | |
| 2,922,733 A | 1/1960 | Henning | |
| 3,848,839 A | 11/1974 | Tillman | |
| 4,252,289 A | 2/1981 | Herb | |
| 4,338,707 A | 7/1982 | Byerly | |
| 4,460,139 A | 7/1984 | Bochen et al. | |
| 4,991,801 A | 2/1991 | Trumbull | |
| 5,129,608 A | 7/1992 | Goldman | |
| 5,180,124 A | 1/1993 | Pascor | |
| 5,435,506 A | 7/1995 | Wiley | |
| 5,971,330 A | 10/1999 | Noba et al. | |
| 6,561,471 B1 | 5/2003 | Hawie | |
| 6,595,472 B1 | 7/2003 | Pisczak | |
| 6,669,150 B2 | 12/2003 | Benoit et al. | |
| 6,676,091 B2 | 1/2004 | Hauer | |
| 6,892,990 B2 * | 5/2005 | Pisczak | 248/74.4 |
| 7,467,767 B2 * | 12/2008 | Miles et al. | 248/74.1 |
| 7,546,986 B2 * | 6/2009 | Kim | 248/62 |
| 7,770,848 B2 * | 8/2010 | Johnson et al. | 248/65 |
| 7,959,114 B2 * | 6/2011 | Spreitzer et al. | 248/62 |

(Continued)

OTHER PUBLICATIONS

Non-Final Office Action dated Aug. 9, 2012 for U.S. Appl. No. 12/731,940, filed Mar. 25, 2010, 18 pgs.

*Primary Examiner* — Terrell McKinnon
*Assistant Examiner* — Steven Marsh
(74) *Attorney, Agent, or Firm* — Brooks Kushman P.C.

(57) ABSTRACT

A grommeted clamp assembly is provided for securing an elongated member to an underlying surface. The grommeted clamp assembly includes a grommet having a generally tubular body with an ovate cross section. An opening extends lengthwise along the body and is sized for receiving an elongated member. The grommet includes at least one transverse projection. The assembly includes a pair of clamp portions each having an anchoring end, an interlocking end, and a curved portion. A second anchoring end is configured for alignment with the first anchoring end. A second interlocking end is configured for being received by a slot of the first interlocking end. A second curved portion cooperates with a first curved portion to collectively support the grommet. At least one of the curved portions includes an elongated slot for receiving the at least one transverse projection for retaining the grommet.

11 Claims, 4 Drawing Sheets

U.S. PATENT DOCUMENTS

| | | |
|---|---|---|
| 8,091,839 B2 * | 1/2012 | Whipple et al. ............. 248/67.7 |
| 2002/0179780 A1 | 12/2002 | Benoit et al. |
| 2004/0238698 A1 | 12/2004 | Shereyk et al. |
| 2005/0098688 A1 | 5/2005 | Miarka et al. |
| 2006/0213039 A1 | 9/2006 | Sampson |
| 2007/0272806 A1 | 11/2007 | Kim |

* cited by examiner

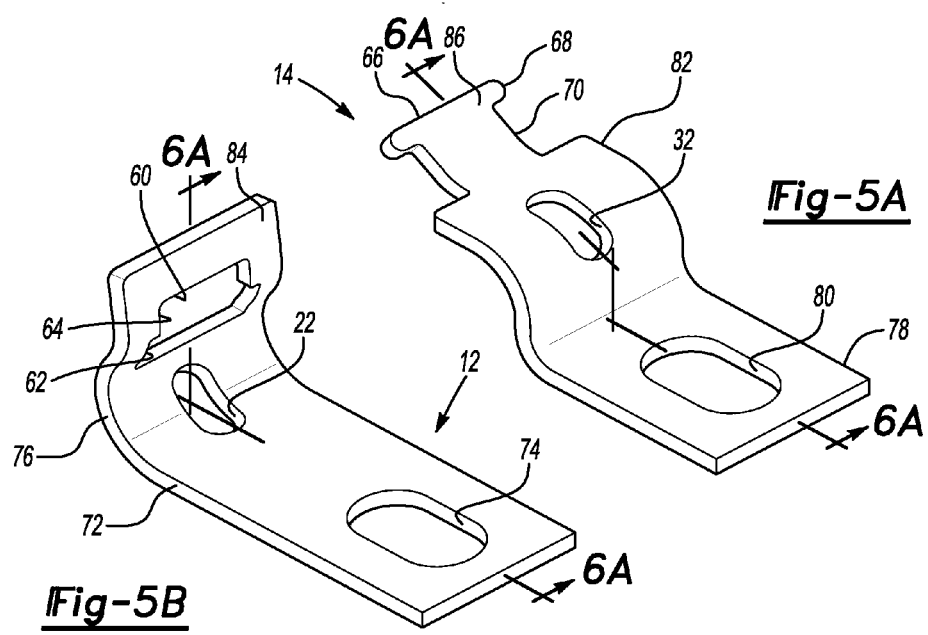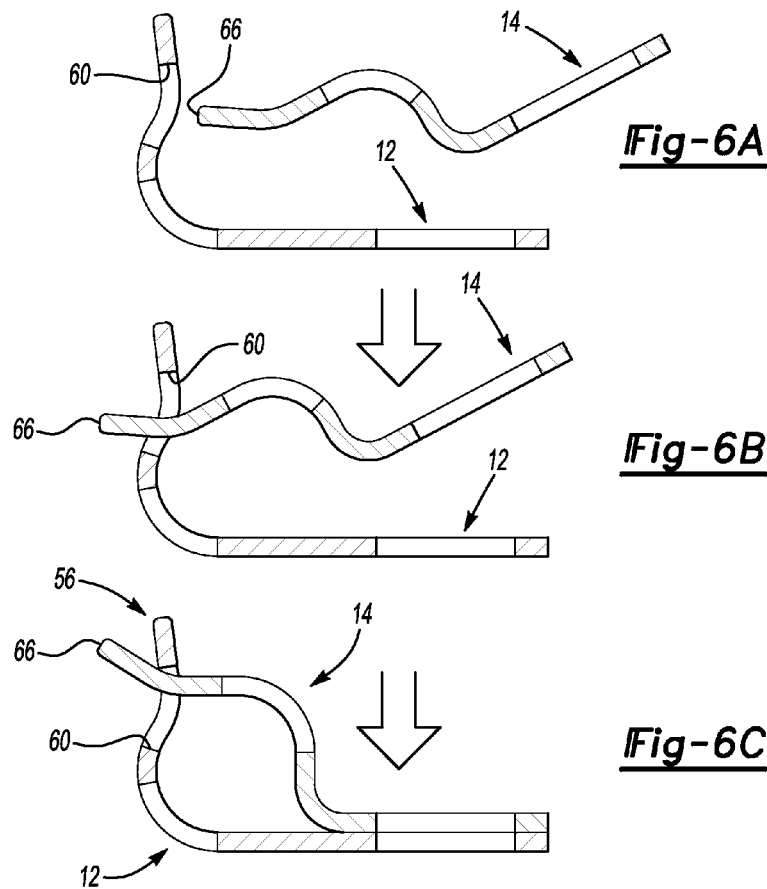

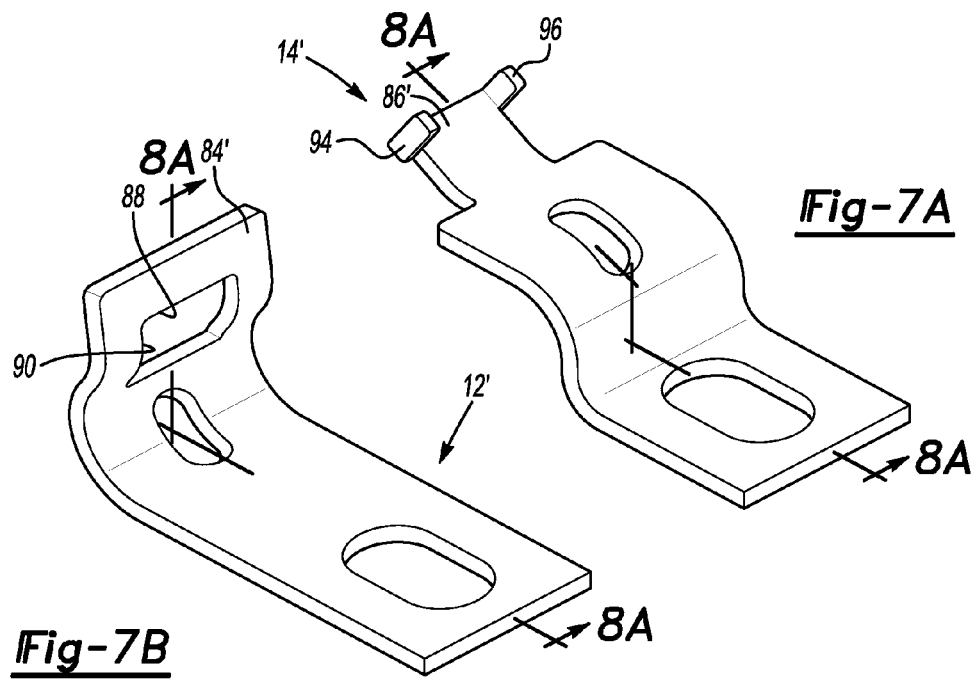
*Fig-7A*
*Fig-7B*
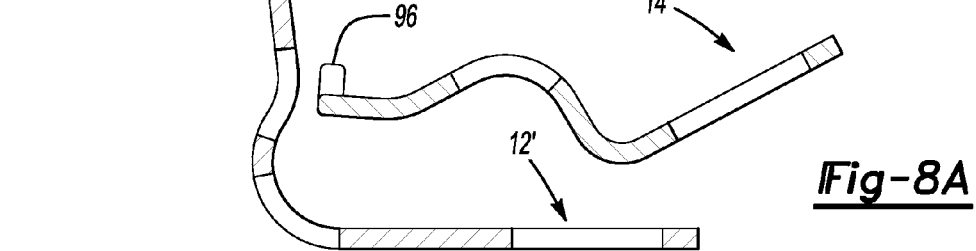
*Fig-8A*
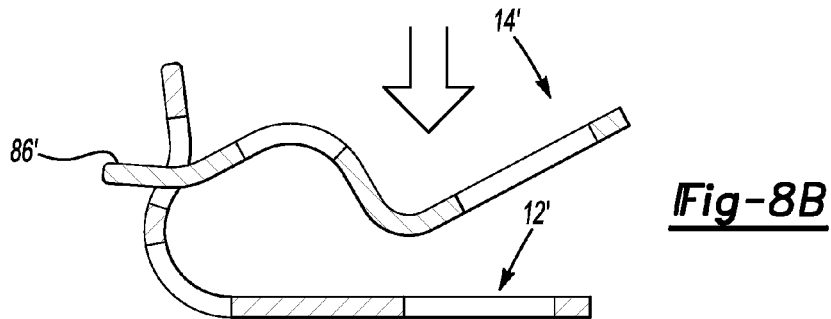
*Fig-8B*
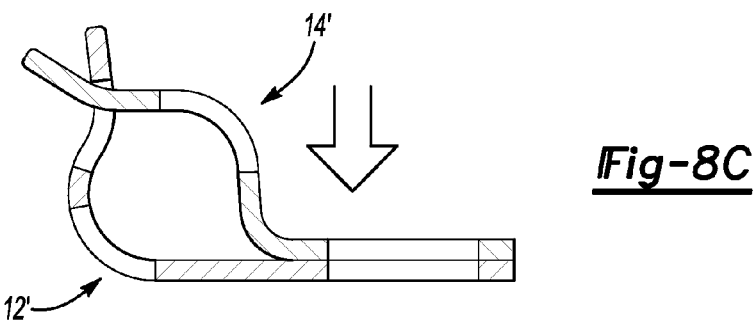
*Fig-8C*

GROMMETED CLAMP ASSEMBLY

CROSS-REFERENCE TO RELATED APPLICATIONS

This application claims the benefit of U.S. provisional Application No. 61/156,075 filed Feb. 27, 2009. The disclosure of which is incorporated in its entirety by reference herein.

TECHNICAL FIELD

The field relates to clamps for tubes, pipes, hoses, ducts, lines, cables and harnesses.

BACKGROUND

Clamps are devices used to secure articles to a supporting surface. One type of clamp is a tube clamp, that is used to engage and secure a tubular article to a supporting surface. The tubular article may be a pipe, hose, duct, line, cable or harness. The supporting surface may be an engine block or chassis member for a vehicular application, or a wall or beam for a architectural application.

In vehicle applications clamps are used to secure hydraulic, pneumatic, mechanical and electrical tubes. Hydraulic tubes or lines are commonly used for a variety of systems including: brake systems, fuel systems, heating, ventilation and air conditioning (HVAC) systems and power steering systems. Common systems using pneumatic tubes or hoses include: lift, leveling and stabilizing systems. Mechanical tubes or cables are commonly used on a variety of systems including: hood and trunk release cables, parking brake cables and shifter cables. Electrical tubes or harnesses connect the various electrical systems and components on the vehicle including: power generation and storage, controllers and sensors. A variety of clamps are currently used to secure these tubes on a vehicle.

Metal clamps are often used for rigid attachment of heavy tubes in demanding environments, whereas plastic straps are often used for flexible attachments. A metal clamp may damage a tube if it is not properly assembled and does not properly engage the tube. If there is any clearance between the clamp and the tube when retained, then noise or wear of the tube may develop over time. Plastic straps are elastic and conform to the exterior shape of a tube, which may prevent wear. However, plastic straps typically do not have the strength to support larger tubes and the plastic straps are not suited for high temperature applications.

Grommeted clamps have been developed for applications requiring the high strength of a metal clamp and elasticity of a plastic strap. These clamps typically include an elastic material that conforms to the exterior of a tube with a metal bracket to clamp around the elastic material and anchor the tube to a supporting surface.

One common approach for a grommeted clamp includes shipping the metal portions along with an elastic grommet as individual components, where one assembles the grommeted clamp assembly prior to securing the tube. This approach can be time intensive, and can lead to potential problems if the grommeted clamp is not assembled properly.

Another approach for a grommeted clamp assembly includes over molding an elastic material to a metal clamp subassembly, then providing a single grommeted clamp assembly to the user. This approach saves assembly time at the plant, however many products that are currently available do not properly secure the tube.

One example of an over molded grommeted clamp assembly that does not properly secure the tube includes a metal clamp that is over molded with elastic material while it is in an open position. Once the grommeted clamp assembly is closed around a tube, the cavity formed by the elastic material is of an irregular shape and does not conform to the exterior portion of the tube. The clearance between the grommeted clamp assembly and the tube may result in wear to the tube and objectionable noise.

Another example of an over molded grommeted clamp assembly that does not properly secure the tube includes a metal clamp that is over molded with elastic material while it is in a closed position. The elastic material resists plastic deformation, and results in a grommeted clamp that is difficult for a user to open and engage the tube during assembly.

SUMMARY

In at least one embodiment a grommeted clamp assembly is provided for securing an elongated member to an underlying surface. The grommeted clamp assembly includes a grommet having a generally tubular body with an ovate cross section. A pair of flanges extend radially from opposing ends of the body with an opening extending lengthwise along the body. The opening is sized for receiving an elongated member and the grommet includes at least one transverse projection extending from a central portion of the body. The assembly also includes a first clamp portion with a first anchoring end for resting upon an underlying surface, a first interlocking end with a slot projecting therethrough, and a first curved portion formed between the first anchoring end and the first interlocking end. The assembly also includes a second clamp portion with a second anchoring end configured for alignment with the first anchoring end, a second interlocking end configured for being received by the slot of the first interlocking end, and a second curved portion cooperating with the first curved portion to collectively support the grommet. At least one of the first curved portion and the second curved portion includes an elongated slot for receiving the at least one transverse projection for retaining the grommet.

In another embodiment, a method for securing an elongated member to an underlying surface with a clamp assembly is provided. A first clamp portion is formed with a first anchoring end, a first curved portion and a first interlocking end. The first interlocking end having a slot with a uniform width and the first curved portion having a first elongated slot. A second clamp portion is formed with a second anchoring end, a second curved portion and a second interlocking end. The second interlocking end having a notched end with a pair of transverse ears, and the second curved portion having a second elongated slot. The notched end is inserted into the slot. The ears are plastically deformed to extend beyond the uniform width of the slot, thereby locking the second clamp portion to the first clamp portion. The elongated member is received between the first and second anchoring ends. The first anchoring end of the first clamp portion is secured to the second anchoring end of the second clamp portion and the assembly is mounted to an underlying surface.

In yet another embodiment, a method of securing a tube to an underlying surface with a grommeted clamp assembly is provided. A first clamp portion is formed with a first anchoring end, a first curved portion and a first interlocking end. The first interlocking end includes a slot and the first curved portion includes a first elongated slot. A second clamp portion is formed with a second anchoring end, a second curved portion and a second interlocking end. The second interlocking end includes a notched end with distal outer width that is wider than an adjacent inner width. The second curved portion includes a second elongated slot. A grommet is formed with a generally tubular body with an ovate cross section. A pair of flanges extend radially from opposing ends of the body. An opening extends lengthwise along the body, and the opening is sized for receiving a tube. The grommet includes a pair of projections extending in opposing directions from the body. The notched end is inserted into the slot. A first projection of the grommet is inserted into the first elongated slot. A second projection of the grommet is inserted into the second elongated slot. The opening of the grommet is aligned between the first anchoring end and the second anchoring end. The tube is engaged at the opening of the grommet. The tube is then enclosed within the cavity of the grommet. The first anchoring end of the first clamp portion is aligned with the second anchoring end of the second clamp portion. The first anchoring end of the first clamp portion is secured to the second anchoring end of the second clamp portion and mounted to an underlying surface.

BRIEF DESCRIPTION OF THE DRAWINGS

FIG. 5A is a perspective view of a second clamp portion of the grommeted clamp assembly of FIG. 1;

FIG. 5B is a perspective view of a first clamp portion of the grommeted clamp assembly of FIG. 1;

FIG. 6A is a section view of the first and second clamp portions of FIGS. 5A and 5B taken along section lines 6A-6A, shown in an initial assembly position;

FIG. 6B is another section view of the first and second clamp portions of FIGS. 5A and 5B taken along section lines 6A-6A, shown in an intermediate assembly position;

FIG. 6C is yet another section view of the first and second clamp portions of FIGS. 5A and 5B taken along section lines 6A-6A, shown in an assembled position;

FIG. 7A is a perspective view of a second clamp portion according to another embodiment of the present invention;

FIG. 7B is a perspective view of a first clamp portion according to the embodiment illustrated in FIG. 7A;

FIG. 8A is a section view of the first and second clamp portions of FIGS. 7A and 7B taken along section lines 8A-8A, shown in the initial assembly position;

FIG. 8B is another section view of the first and second clamp portions of FIGS. 7A and 7B taken along section lines 8A-8A, shown in the intermediate assembly position; and FIG. 8C is yet another section view of the first and second clamp portions of FIGS. 7A and 7B taken along section lines 8A-8A, shown in the assembled position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
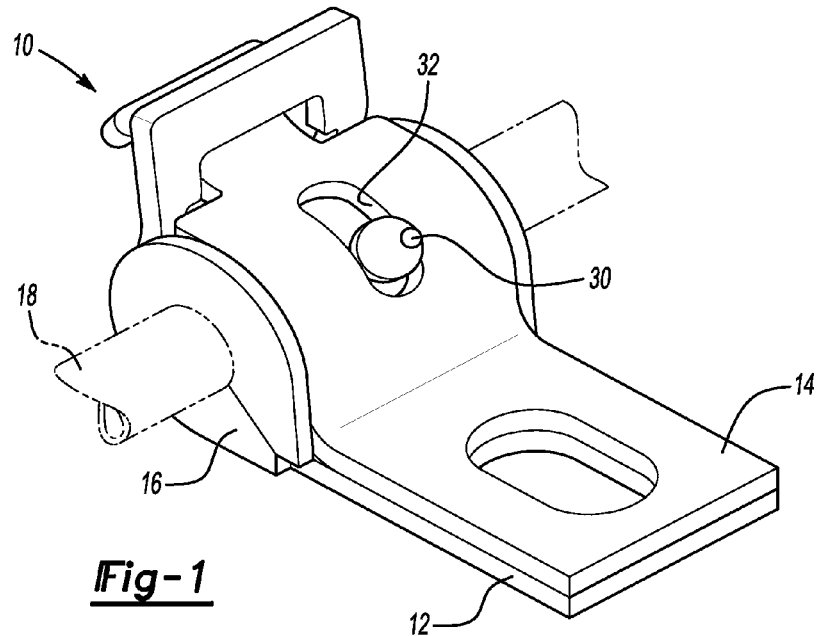
FIG. 1 is a perspective view of a grommeted clamp assembly according to an embodiment of the present invention, illustrated supporting an elongated member.

With reference to FIG. 1, a grommeted clamp assembly is illustrated in accordance with an embodiment of the present invention and is referenced by numeral 10. The grommeted clamp assembly 10 includes a first clamp portion 12 and a second clamp portion 14, which are assembled about a grommet 16. Once assembled, the grommeted clamp assembly 10 is fastened to a supporting surface to secure a tube 18. The grommeted clamp assembly may be used to secure a variety of tubes including: pipes, hoses ducts, lines, cables and harnesses. An exemplary example of one such application of a grommeted clamp assembly is to secure fuel lines on an automotive vehicle.

Figure 2:
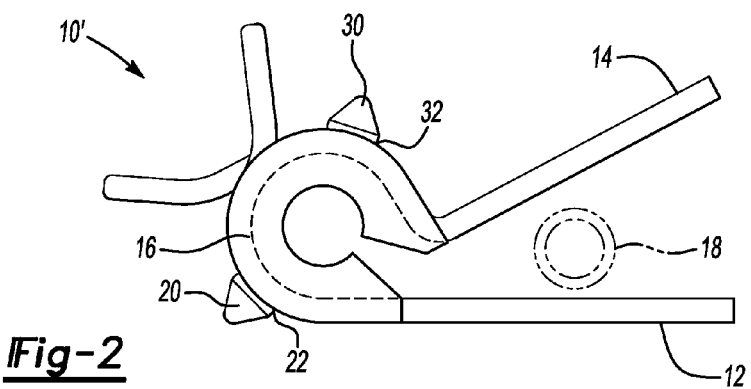
FIG. 2 is a side elevation view of the grommeted clamp assembly of FIG. 1, illustrated in an open assembly position.
Figure 3:
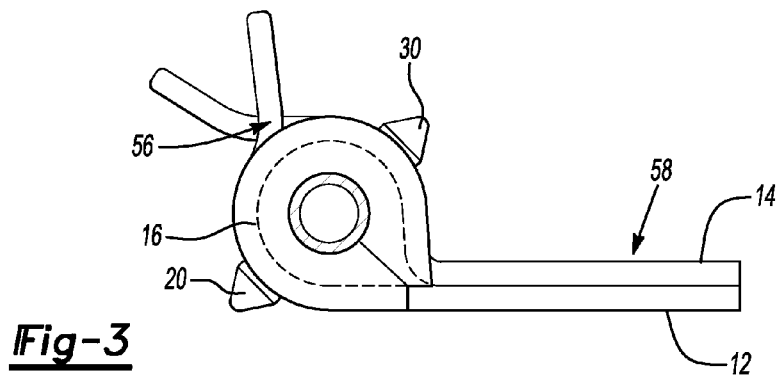
FIG. 3 is a side elevation view of the grommeted clamp assembly of FIG. 1, illustrated in a closed assembly position.

Referring to FIGS. 2 and 3 the grommeted clamp assembly 10 is shown in the open position in FIG. 2 and the closed position in FIG. 3. The grommeted clamp assembly 10 is provided to the user as a single unit. For installation, the user first opens the grommeted clamp assembly 10' by separating the second clamp portion 14 from the first clamp portion 12 as illustrated in FIG. 2. Then the user engages the tube 18 with the open grommeted clamp assembly 10'. Once the user releases the clamp portions the grommeted clamp assembly returns to the closed position to retain the tube 18, as illustrated in FIG. 1. Then the user secures the grommeted clamp assembly 10 to a supporting surface using a fastener (not shown).

Referring to FIGS. 1-3 and 4C, the grommet 16 is attached to the first clamp portion 12 by a first projection 20 through a first elongated slot 22. The projection includes cylindrical shaft 24 with a conical head 26. The diameter of a base 28 of the first conical head 26 has a larger diameter than the diameter of the cylindrical shaft 24. The width of the elongated slot 22 is a dimension greater than the diameter of the cylindrical shaft 24, and the width is smaller than the dimension of the diameter of the base 28. The grommet 16 is made of a flexible material such that when the first projection 20 is inserted into the first elongated slot 22, the conical head 24 and base 28 elastically deform and pass through the first elongated slot 22. The base 28 has a diameter that is larger than the width of the first elongated slot 22 and after passing through the slot the conical head 24 and base 28 return to their normal dimensions to retain the grommet 16 on the first clamp portion 12. In a similar fashion, the grommet 16 is attached to the second clamp portion 14 by a second projection 30 and its interaction with a second elongated slot 32.

Figure 4A:
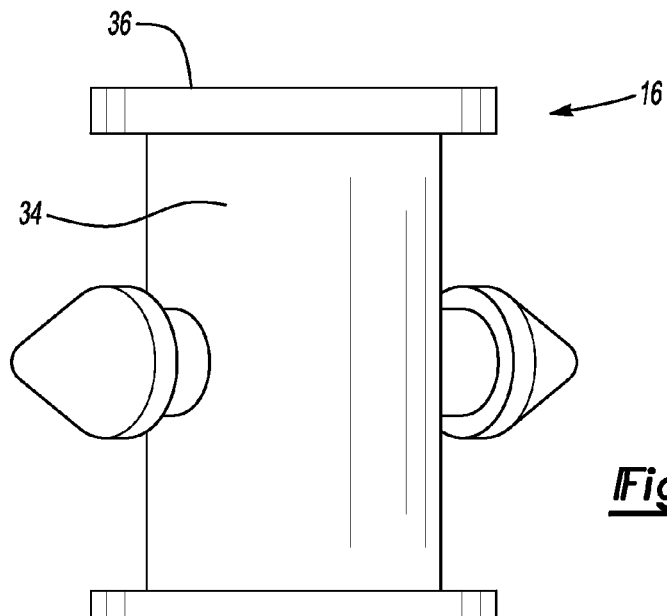
FIG. 4A is a top plan view of a grommet of FIG. 1.
Figure 4B:
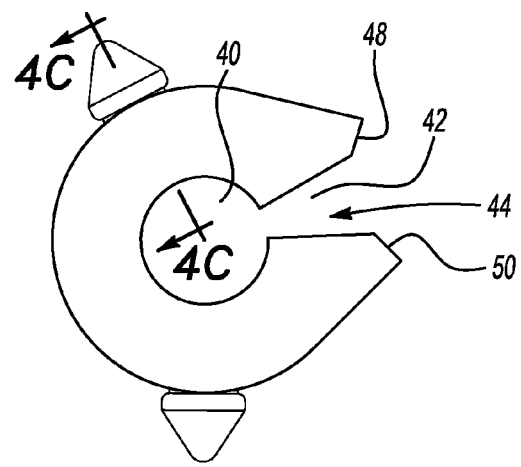
FIG. 4B is a side elevation view of the grommet of FIG. 1.
Figure 4C:
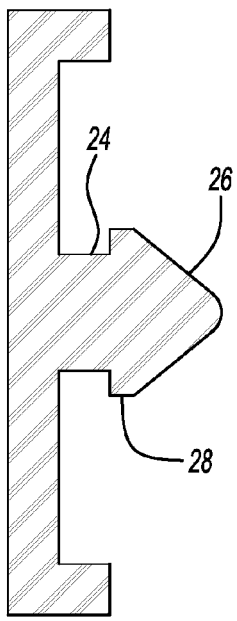
FIG. 4C is a cross-sectional view of the grommet of FIGS. 4A and 4B taken along section line 4C-4C.
Figure 4D:
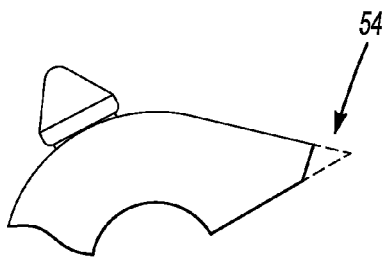
FIG. 4D is a fragmented view of the grommet of FIG. 4B.

With reference to FIGS. 4A-4C, the grommet 16 has a body 34 that is tubular in shape with a first end 36 and a second end 38 that opposes the first end 36. The diameter of both the first end 36 and the second end 38 are larger than the diameter of the body 34. The perpendicular dimension between the first and second end is greater than the width of the first and second clamp portions 12 and 14. These parameters allow the first and second ends 36 and 38 to position the first and second clamp portions 12 and 14 during the assembly of the grommeted clamp 10 to the clamp portions.

The inner diameter of the grommet 16 forms a cylindrical cavity 40 that extends from the first end 36 to the second end 38. The grommet 16 has an ovate cross sectional shape, whereby an opening 42 is formed along the length of the grommet 16 at the tip 44.

In reference to FIGS. 4A-4D, the grommet 16 is a molded elastic material, such as EPDM, Neoprene, Silicone, HNBR, Nitrile or Viton®. The material selected will preferably have a Shore Durometer Hardness between 60-80 Shore A. The grommet 16 is "molded open", as seen in FIG. 4B, with the opening 42 incorporated into the mold, as opposed to cutting the opening 42 after the mold process. By incorporating the opening 42 into the mold process, a first lead-in surface 48 and opposing second lead-in surface 50 are created. The function of these lead-in surfaces is to replace a ledge 54, that would be present if the opening 42 in the grommet 16 was cut after molding. During assembly, when the user engages the tube with the grommeted clamp assembly, a user could inadvertently contact the tube 18 against the ledge 54, and dislodge the grommet 16 from the clamp portions. By incorporating the opening 42 into the mold process, the ledge 54 can be eliminated and this potential problem is avoided. Alternative embodiments of the grommet 16 are envisioned where the grommet 16 is "molded closed". This molded closed grommet 16, would still include opening 42, however the gap between opposing sides of the grommet 16 would be reduced.

Referring to FIGS. 1-4C, the grommet 16 is molded with an opening 42 in a position illustrated in FIG. 4B. When the grommet 16 is elastically deformed to a different position, the internal stress created within the grommet will oppose the deformation. This internal stress helps prevent the grommeted clamp assembly from disassembling during shipping. When the user opens the grommeted clamp assembly 10' as illustrated in FIG. 2, the grommet 16 provides an opposing force that is reacted through the projections 20 and 30 to the clamp portions 12 and 14. These forces in combination with the lead in features 48 and 50 create a "Snap-fit" as the grommeted clamp assembly 10 engages a tube 18. This "Snap-fit" provides positive feedback to confirm proper assembly to the tube.

With reference to FIG. 3, the clamp portions of the grommeted clamp assembly 10 include an interlocking end 56 and an anchoring end 58. The first clamp portion 12 and second clamp portion are retained in an interlocked position by the grommet 16 as previously described. After the grommeted clamp assembly engages the tube 18, the grommeted clamp assembly 10 is secured to a supporting surface by a fastener at the anchoring end 58.

Referring to FIGS. 5A, 5B and 6C, the first clamp portion 12 and second clamp portion 14 interlock to form a clamp portion subassembly as shown in FIG. 6C. The clamp portion subassembly includes a interlocking end 56 and an anchoring end 58.

In reference to FIG. 5B, the first clamp portion 12 includes a first anchoring end 72, with a first fastener receiving opening 74. The first clamp portion 12 has a first interlocking end 84 with a stepped slot 60 that has a first slot width 62 and a second slot width 64. The first slot width 62 has a greater width dimension than the second slot width 64. The first clamp portion 12 includes a first curved portion 76 that has a first elongated slot 22. The first curved portion 76 connects the first anchoring end 72 to the first interlocking end 84.

Referring to FIG. 5A, the second clamp portion 14 includes a second anchoring end 78, with a second fastener receiving opening 80. The second clamp portion 14 has a second interlocking end 86 including a notched end 66. The notched end 66 has an outer width 68 and an inner width 70, whereby the outer width 68 has a greater width dimension than the inner width 70. The outer width 68 has a width dimension that is smaller than the first slot width 62 and larger than the second slot width 64. The inner width 70 has a width dimension that is smaller than the width dimension of both the first and second slot widths 62 and 64. The second clamp portion includes a second curved portion 82 with a second elongated slot 32. The second curved portion 82 connects the second anchoring end 78 to the second interlocking end 86.

During the assembly of the clamp portions to each other, first the notched end 66 of the second clamp portion 14 is positioned with the outer width 68 aligned to the first slot width 62 of the stepped slot 60 as shown in FIG. 6A. As shown in FIG. 6B, the first slot width 62 of the stepped slot 60 receives the outer width 68 of the notched end 66 as the second clamp portion 14 is inserted into the first clamp portion 12. Then the clamp portions are moved into their interlocked positions by translating the inner width 70 of the notched end 66 upwards into the second slot width 64, while pivoting the second clamp portion 14 about the interlocking end 56 towards the first clamp portion 12 at the anchoring end 58 as shown in FIG. 6C. The two clamp portions are interlocked, however they can be easily unlocked or disassembled by reversing the assembly process. Once the grommet 16 is attached to the clamp portions as previously described, the grommeted clamp assembly resists disassembly.

FIGS. 7A-8C describe another embodiment of the invention with additional steps added to the assembly process of the first clamp portion 12' to the second clamp portion 14'. These additional steps allow the clamp portions to be securely interlocked to each other prior to their attachment to the grommet 16.

The first clamp portion 12' includes a first interlock aperture 88 that has an aperture width 90 of a uniform dimension. The second clamp portion 14' includes a second interlocking end 86' with a first ear 94 and a second ear 96. During the assembly of the clamp portions to each other, the second interlocking end 86' of the second clamp portion 14' is aligned with the aperture width 90 of the interlock aperture 88 as shown in FIG. 8A. Next the interlock aperture 88 receives the second interlocking end 86' as the second clamp portion 14' is inserted into the first clamp portion 12' as shown in FIG. 8B. The first and second ears 94 and 96 of the second interlocking end are then plastically deformed to be coplanar with the second interlocking end 86'. After bending, the first and second ears 94 and 96 resemble the notched end of the second clamp portion shown in FIG. 5A. The width dimension of the coplanar ears is wider than the width dimension of the interlock aperture 88. The coplanar ears extend across the aperture width 90 to hold the first and second clamp portions 12' and 14' together.

The embodiment illustrated in FIGS. 7A-8C allows the clamp portions 12' and 14' to be assembled together as a sub assembly that can be subjected to secondary manufacturing operations prior to the attachment of the grommet 16. For example, the sub assembly can be heat treated or plated prior to the installation of the grommet. Since clamp portions 12' and 14' are securely interlocked together, alternate clamp assembly embodiments are envisioned, containing clamp portions 12' and 14' without a grommet 16.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A grommeted clamp assembly comprising:
   a grommet having a generally tubular body with an ovate cross section, the body having a pair of flanges extending radially from opposing ends of the body with an opening extending lengthwise along the body, the opening sized for receiving an elongated member, the grommet having at least one transverse projection extending from a central portion of the body;

a first clamp portion having a first anchoring end for resting upon an underlying surface, a first interlocking end with a slot projecting therethrough, and a first curved portion formed between the first anchoring end and the first interlocking end; and a second clamp portion having a second anchoring end configured for alignment with the first anchoring end, a second interlocking end configured for being received by the slot of the first interlocking end, and a second curved portion cooperating with the first curved portion to collectively support the grommet, wherein at least one of the first curved portion and the second curved portion includes an elongated slot for receiving the at least one transverse projection for retaining the grommet;

wherein each transverse projection further comprises a shaft with a distal head, each head having a diameter sized larger than a shaft diameter and smaller than an elongated slot width for retaining the grommet to each of the first clamp portion and the second clamp portion.

2. The assembly of claim 1 wherein the grommet further comprises an open molded grommet having a smooth cylindrical cavity and pair of opposing lead-in surfaces formed at the opening for engaging and securing the elongated member.

3. The assembly of claim 1 wherein the at least one transverse projection further comprises a pair of transverse projections that are oriented generally diametrically opposite one another when the grommet is in a closed position.

4. The assembly of claim 3 wherein each of the first curved portion and the second curved portion include the elongated slot for receiving one of the transverse projections, and wherein a width of each curved portion is sized for orientation between the pair of flanges.

5. The assembly of claim 1 wherein the first interlocking end further comprises a stepped slot having a lower slot width that is greater than an upper slot width.

6. The assembly of claim 5 wherein the second interlocking end further comprises a notched end having an outer width that is smaller than the lower slot width and greater than the upper slot width, such that the notched end is received by the lower slot width, and retained by the upper slot width.

7. The assembly of claim 1 wherein the first interlocking end further comprises an interlock aperture having a uniform width, the interlock aperture being sized for receiving the second interlocking end.

8. The assembly of claim 7 wherein the second interlocking end further comprises a pair of ears having a transverse orientation for insertion into the interlock aperture, the ears sized to extend beyond the uniform width when plastically deformed for locking the second clamp portion to the first clamp portion.

9. A method of securing an elongated member to an underlying surface with a grommeted clamp assembly, the method comprising:

forming a first clamp portion with a first anchoring end, a first curved portion and a first interlocking end, the first interlocking end having a slot with a lower slot width and an upper slot width and the first curved portion having a first elongated slot;

forming a second clamp portion with a second anchoring end, a second curved portion and a second interlocking end, the second interlocking end having a notched end with a distal outer width that is wider than an adjacent inner width, and the second curved portion having a second elongated slot;

forming a grommet having a generally tubular body with an ovate cross section, the body having a pair of flanges extending radially from opposing ends of the body with an opening extending lengthwise along the body, the opening sized for receiving an elongated member, the grommet having a pair of projections extending in opposing directions from the body;

inserting the notched end into the lower slot width of the first clamp portion;

rotating the notched end into the upper slot width of the first clamp portion, where the upper slot width is smaller than the lower slot width for connecting the clamp portions to each other;

inserting a first projection of the grommet into the first elongated slot;

inserting a second projection of the grommet into the second elongated slot;

wherein the grommet is configured to bias the notched end into the upper slot width for maintaining the connection of the second clamp portion to the first clamp portion; and aligning the opening of the grommet between the first anchoring end and the second anchoring end.

10. The method of claim 9 further comprising:

engaging the elongated member at the opening of the grommet;

orienting the elongated member with a cavity of the grommet;

aligning the first anchoring end of the first clamp portion with the second anchoring end of the second clamp portion; and securing the first anchoring end of the first clamp portion to the second anchoring end of the second clamp portion and mounting to an underlying surface.

11. A method of securing an elongated member to an underlying surface with a grommeted clamp assembly, the method comprising:

forming a first clamp portion with a first anchoring end, a first curved portion and a first interlocking end, the first interlocking end having a slot and the first curved portion having a first elongated slot;

forming a second clamp portion with a second anchoring end, a second curved portion and a second interlocking end, the second interlocking end having a notched end with a distal outer width that is wider than an adjacent inner width, and the second curved portion having a second elongated slot;

forming a grommet having a generally tubular body with an ovate cross section, the body having a pair of flanges extending radially from opposing ends of the body with an opening extending lengthwise along the body, the opening sized for receiving an elongated member, the grommet having a pair of projections extending in opposing directions from the body;

inserting the notched end into the slot;

inserting a first projection of the grommet into the first elongated slot;

inserting a second projection of the grommet into the second elongated slot;

aligning the opening of the grommet between the first anchoring end and the second anchoring end;

inserting the notched end into a lower slot width of the first clamp portion;

rotating the notched end into an upper slot width of the first clamp portion, where the upper slot width is smaller than the lower slot width for connecting the clamp portions to each other, wherein the grommet is configured to bias the notched end into the upper slot width for maintaining the connection of the second clamp portion to the first clamp portion;

engaging the elongated member at the opening of the grommet;

orienting the elongated member with a cavity of the grommet;

aligning the first anchoring end of the first clamp portion with the second anchoring end of the second clamp portion; and securing the first anchoring end of the first clamp portion to the second anchoring end of the second clamp portion and mounting to an underlying surface.

\* \* \* \* \*